(12) United States Patent
Blevins et al.

(10) Patent No.: US 12,031,010 B2
(45) Date of Patent: Jul. 9, 2024

(54) METHODS FOR PREPARING AND COMPOSITIONS INCLUDING UNTREATED AND SURFACE-TREATED ALKALINE EARTH METAL CARBONATES

(71) Applicant: INCOA Performance Minerals, LLC, Salt Lake City, UT (US)

(72) Inventors: Charles Michael Blevins, Daphne, AL (US); Allison Anne Calhoun, Walla Walla, WA (US)

(73) Assignee: INCOA Performance Minerals, LLC, Theodore, AL (US)

( * ) Notice: Subject to any disclaimer, the term of this patent is extended or adjusted under 35 U.S.C. 154(b) by 762 days.

(21) Appl. No.: 16/763,150

(22) PCT Filed: Oct. 22, 2018

(86) PCT No.: PCT/US2018/056867
§ 371 (c)(1),
(2) Date: May 11, 2020

(87) PCT Pub. No.: WO2019/099152
PCT Pub. Date: May 23, 2019

(65) Prior Publication Data
US 2021/0214522 A1 Jul. 15, 2021

Related U.S. Application Data

(60) Provisional application No. 62/735,373, filed on Sep. 24, 2018, provisional application No. 62/587,932, filed on Nov. 17, 2017.

(51) Int. Cl.
*C08K 3/26* (2006.01)
*B02C 17/16* (2006.01)
(Continued)

(52) U.S. Cl.
CPC ............. *C08K 3/26* (2013.01); *B02C 17/16* (2013.01); *B02C 17/1815* (2013.01);
(Continued)

(58) Field of Classification Search
None
See application file for complete search history.

(56) References Cited

U.S. PATENT DOCUMENTS

2002/0022084 A1  2/2002  Calhoun et al.
2007/0167531 A1  7/2007  Preston et al.
(Continued)

FOREIGN PATENT DOCUMENTS

CN    101812238 A    8/2010
CN    102634240 A    8/2012
(Continued)

OTHER PUBLICATIONS

Notification of the First Office Action for Chinese Application No. 201880074047.9 dated Dec. 1, 2021 with English translation.
(Continued)

*Primary Examiner* — Daniel Berns
(74) *Attorney, Agent, or Firm* — Womble Bond Dickinson (US) LLP (57) ABSTRACT

Methods for preparing and compositions including untreated and surface-treated alkaline earth metal carbonate particulates are described. For example, a method for processing alkaline earth metal carbonate may include introducing alkaline earth metal carbonate into a stirred media mill, and dry grinding the alkaline earth metal carbonate in the stirred media mill to produce an untreated alkaline earth metal carbonate particulate having certain characteristics. In some examples, the method may include introducing carboxylic acid and/or carboxylic acid salt into the stirred media mill, and dry grinding the alkaline earth metal carbonate and the
(Continued)

carboxylic acid and/or carboxylic acid salt in an integrated dry grinding and surface-treating process in the stirred media mill to produce a surface-treated alkaline earth metal carbonate particulate. In some examples, heating may be added during the dry grinding process.

23 Claims, 2 Drawing Sheets (51) Int. Cl.
*B02C 17/18* (2006.01)
*B02C 21/00* (2006.01)
*B02C 23/12* (2006.01)
*C01F 11/18* (2006.01)
*C08J 5/18* (2006.01)
*C08K 9/04* (2006.01)
*C09C 1/02* (2006.01)
*C09D 11/037* (2014.01)
*C09J 11/04* (2006.01)

(52) U.S. Cl.
CPC .......... *B02C 17/1845* (2013.01); *B02C 21/00* (2013.01); *B02C 23/12* (2013.01); *C01F 11/185* (2013.01); *C08J 5/18* (2013.01); *C08K 9/04* (2013.01); *C09C 1/021* (2013.01); *C09D 11/037* (2013.01); *C09J 11/04* (2013.01); *C01P 2004/03* (2013.01); *C01P 2004/61* (2013.01); *C01P 2004/62* (2013.01); *C01P 2006/82* (2013.01); *C08J 2323/00* (2013.01); *C08J 2327/06* (2013.01); *C08J 2375/04* (2013.01); *C08K 2003/265* (2013.01); *C08K 2201/005* (2013.01)

(56) References Cited

U.S. PATENT DOCUMENTS

| 2015/0083831 | A1 | 3/2015 | Shaw et al. |
| 2017/0129782 | A1 | 5/2017 | Buri et al. |
| 2017/0275175 | A1 | 9/2017 | Buri et al. |
| 2018/0353930 | A1 | 12/2018 | Rentsch et al. |

FOREIGN PATENT DOCUMENTS

| CN | 107075172 A | 8/2017 |
| WO | WO 1999/028050 A1 | 6/1999 |
| WO | WO 01/85832 A2 | 11/2001 |
| WO | WO 2016/041781 A1 | 3/2016 |
| WO | WO 2017/220167 A1 | 12/2017 |

OTHER PUBLICATIONS

Wu et al., Mechanochemical Surface Modification of Particles by Polymer Grafting, 2005, retrieved from internet <url:http://www.sibran.ru/upload/iblock/bf2/bf22141ccleb7c896247ed4f1203fa.50.pdf> pp. 149-154.

METHODS FOR PREPARING AND COMPOSITIONS INCLUDING UNTREATED AND SURFACE-TREATED ALKALINE EARTH METAL CARBONATES

CLAIM OF PRIORITY

This is a 35 U.S.C. § 371 national stage entry of PCT International Patent Application No. PCT/US2018/056867, filed Oct. 22, 2018, which claims benefit of the filing dates of U.S. Provisional Application No. 62/587,932, filed Nov. 17, 2017, and U.S. Provisional Application No. 62/735,373, filed Sep. 24, 2018, the disclosures of all of which are incorporated herein by reference.

BACKGROUND

Alkaline earth metal carbonates, such as, for example, calcium carbonates, may be used as particulate fillers in end products including polymer compositions. For example, alkaline earth metal carbonates may be incorporated into polymer compositions for forming products such as, for example, polyolefin containing products, polymer films, adhesives, sealants, caulks, and rigid vinyl products, such as vinyl siding, vinyl gutters, vinyl decking, vinyl fencing, vinyl window profiles, and vinyl siding. Some polymer compositions may be used for three-dimensional printing. The polymer compositions from which these films are made may often include a polymer (e.g., a thermoplastic polymer) and an alkaline earth metal carbonate, such as calcium carbonate, which may be used as a filler or for other purposes. The characteristics of the alkaline earth metal carbonate may play an important role in the processing of the polymer composition and/or may affect characteristics of the polymer containing product. Thus, it may be desirable to provide alkaline earth metal carbonates having characteristics that improve the processing and/or final characteristics of the polymer containing product.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

This disclosure is generally directed to methods for preparing untreated and surface-treated alkaline earth metal carbonate particulates. For example, a method for processing alkaline earth metal carbonate may include introducing alkaline earth metal carbonate into a stirred media mill, and dry grinding the alkaline earth metal carbonate in the stirred media mill to produce an untreated alkaline earth metal carbonate particulate having certain characteristics. In some examples, the method may include introducing carboxylic acid and/or carboxylic acid salt into the stirred media mill, and dry grinding, in an integrated dry grinding and surface-treating process, the alkaline earth metal carbonate and the carboxylic acid and/or carboxylic acid salt in the stirred media mill to produce a surface-treated alkaline earth metal carbonate particulate.

In some examples, a dry grinding process may be characterized by adding the material to be ground to a mill without the addition of water or another liquid prior to or during the dry grinding process. For example, the absence of water or other liquids in some examples of this process may provide a ground mineral without entrained water or other chemicals that are known to interfere with the final performance of the alkaline earth metal carbonate particulate in its intended use. For example, entrained water is known to create degradation of water reactive polymers, offgas during high temperature polymer processing which leads to material defects, and/or to promote agglomeration that may interfere with effective dispersion of the ground alkaline earth metal carbonate particulate in a variety of polymeric systems. Residual chemicals, other than water, are known to promote degradation of a variety of polymeric materials and act to absorb water into the particulate.

In some examples, the dry grinding process may be characterized by the absence of friable media (e.g., ceramic grinding media) in the mill. The absence of friable media prevents the introduction of fragmented pieces of the media that are generated during the grinding process that may create interfering particles that may damage processing equipment, create point defects, and/or interfere with processing of polymeric materials.

In some examples, the dry grinding process may be characterized by an absence of grinding aids and/or process chemicals in the mill during the dry grinding process, which may result in one or more of the above-noted attributes.

In some examples, the raw feed of the alkaline earth metal carbonate may include calcium carbonate sourced from a reserve providing a particulate metal carbonate that has a minimum purity of, for example, about 98.5% calcium carbonate, as measured by x-ray fluorescence (XRF), or greater than, for example, about 99% calcium carbonate with a level of acid insoluble minerals below, for example, about 0.50%, or below, for example, about 0.25%. Some examples of these acid insoluble minerals may be of a natural size of below, for example, about 5 microns. In some examples of the raw feed, trace metals of commercial interest may be included at low levels with iron at levels below, for example, about 150 ppm, or below, for example, about 100 ppm as measured by inductively coupled plasma-mass spectrometry (ICP-MS). In some examples, arsenic and/or lead may be present at levels below, for example, about 0.3 ppm (e.g., also measured by ICP-MS), and in some example, mercury may be present below, for example, about 0.01 ppm (e.g., also measured by ICP-MS). In some examples of the raw feed, the morphology of the particles may be of a generally rounded shape.

In some examples, the carboxylic acid and/or carboxylic acid salt may include an aliphatic carboxylic acid. In some examples, the carboxylic acid may include stearic acid. Other types of carboxylic acids and/or carboxylic acid salts are contemplated. In some examples, the alkaline metal earth carbonate may include calcium carbonate. Other types of alkaline metal earth carbonates are contemplated.

In some examples, the alkaline earth metal carbonate introduced into the stirred media mill has a median particle size $d_{50}$ ranging from about 2 microns to about 100 microns. In some examples, the alkaline earth metal carbonate introduced into the stirred media mill has a purity ranging from about 98.5% to about 99.5%. In some examples, the alkaline earth metal carbonate introduced into the stirred media mill has less than about 0.5% by weight quartz, or less than about 0.25% by weight quartz.

"Particle size," as used herein, for example, in the context of particle size distribution (psd), may be measured in terms of equivalent spherical diameter (esd). Particle size properties referred to in the present disclosure may be measured in a well-known manner, for example, by laser using a Malvern LLS device. Such a machine may provide measurements and a plot of the cumulative percentage by volume of particles having a size, referred to in the art as "equivalent spherical diameter" (esd), less than the given esd values. For example, the mean or median particle size $d_{50}$ is the value that may be determined in this way of the particle esd at which there are 50% by volume of the particles that have an esd less than that $d_{50}$ value.

In some examples, the alkaline earth metal carbonate introduced into the stirred media mill has a top cut ranging from about 5 microns to about 125 microns, wherein the top cut is defined as 100% passing on the Malvern LLS device. In some examples, the alkaline earth metal carbonate introduced into the stirred media mill may have a level of sub-0.5 micron particles ranging from about 0% to about 4% of alkaline earth metal carbonate particles (e.g., from about 0% to about 1%, from about 0% to about 0.5%, from about 0.5% to about 1%, or from about 1% to about 4%), wherein the level of sub-0.5 micron particles includes particles having a particle size of 0.5 microns or less (e.g., 0.4 microns or less, 0.3 microns or less, 0.2 microns or less, or 0.1 microns or less). Low levels of sub-0.5 micron particles may improve dispersion and/or may reduce the surface area of the mineral, which may help reduce agglomeration and moisture absorption, additive absorption in formulations, and/or viscosity of the final formulation.

In some examples, the surface-treated alkaline earth metal carbonate may have an agglomeration level of no more than about 2% by weight retained on a #635 mesh screen after suspension in isopropyl alcohol (e.g., no more than about 0.5% by weight). In some examples, the surface-treated alkaline earth metal carbonate may have a moisture content of 0.2% or less water (e.g., 0.075% or less, or 0.05% or less). In some examples, the surface-treated alkaline earth metal carbonate may have a coating level ranging from about 0.5% to about 2.5% by weight (e.g., from about 0.5% to about 2.0%, from about 0.5% to about 1.5%, from about 0.5% to about 1.0%, from about 1.0% to about 2.5%, from about 1.0% to about 2.0%, from about 1.0% to about 1.5%, from about 1.5% to about 2.5%, from about 1.5% to about 2.0%, from about 2.0% to about 2.5%). In some examples, the surface-treated alkaline earth metal carbonate may have a monolayer coating level. In some examples, the surface-treated alkaline earth metal carbonate may have a monolayer coating level that is evenly applied.

In some examples, the surface-treated alkaline earth metal carbonate may include unreacted stearic acid ranging from about 0.01% by weight to about 0.5% by weight. This may be useful in applications in which the carboxylic acid and/or carboxylic acid salt is used as a lubricant in, for example, polyvinyl chloride compositions.

In some examples, the surface-treated alkaline earth metal carbonate particulate may have a steepness ranging from about 1 to about 4, for example, from about 1 to about 2.5, from about 1 to about 2, from about 2 to about 2.5, or from about 2.5 to about 3. Steepness may be defined in terms of span. The span is calculated from the difference between the $d_{90}$ and the $d_{10}$, divided by the $d_{50}$ as: span=$(d_{90}-d_{10})/d_{50}$. The $d_{90}$ is the particle size value that may be determined by the Malvern LLS device (see above) at which there are 90% by weight of the particles that have an esd less than that $d_{90}$ value. The $d_{10}$ is the particle size value that may be determined by the Malvern LLS device (see above) at which there are 10% by weight of the particles that have an esd less than that $d_{10}$ value. A steeper particle distribution (e.g., a distribution having a lower span) may promote dispersion and, for example, in microporous films, may reduce the level of "ineffective" particles that do not create pores in the film, for example, under stretching of the film.

In some examples, the surface-treated alkaline earth metal carbonate particulate has a median particle size $d_{50}$ of about 10 microns or less. In some examples, the surface-treated alkaline earth metal carbonate particulate has a median particle size $d_{50}$ of about 7 microns or less. In some examples, the surface-treated alkaline earth metal carbonate particulate has a median particle size $d_{50}$ of about 5 microns or less. In some examples, the surface-treated alkaline earth metal carbonate particulate has a median particle size $d_{50}$ of about 3 microns or less. In some examples, the surface-treated alkaline earth metal carbonate particulate has a median particle size $d_{50}$ of about 1 micron or less. In some examples, the surface-treated alkaline earth metal carbonate particulate has a median particle size $d_{50}$ ranging from about 7 microns to about 10 microns. In some examples, the surface-treated alkaline earth metal carbonate particulate has a median particle size $d_{50}$ ranging from about 5 microns to about 7 microns. In some examples, the surface-treated alkaline earth metal carbonate particulate has a median particle size $d_{50}$ ranging from about 3 microns to about 5 microns. In some examples, the surface-treated alkaline earth metal carbonate particulate has a median particle size $d_{50}$ ranging from about 0.5 microns to about 3 microns.

In some examples of the method, the stirred media mill may be any grinding mill (e.g., any dry grinding mill), excluding centrifugal mills, and including ball mills, rod mills, and tube mills, for example. In some examples, the method may also include heating the alkaline earth metal carbonate and carboxylic acid and/or carboxylic acid salt during the dry grinding. For example, the heating may include heating the alkaline earth metal carbonate and carboxylic acid and/or carboxylic acid salt such that the surface-treated alkaline earth metal carbonate has a temperature ranging from about 180 degrees F. to about 250 degrees F. In some examples, the material in the stirred media mill may be heated, during or immediately following the dry grinding process to a temperature ranging from, for example, about 125 degrees F. to about 600 degrees F., such as, for example, from about 140 degrees F. to about 280 degrees F., from about 150 degrees F. to about 280 degrees F., from about 280 degrees F. to about 350 degrees F. In some examples, the heating may result directly from the grinding action of the mill, by direct introduction of hot air or gas into the mill via an external heat source, such as, for example, a gas-fired heater or forced or passive air hot air system. In another example, heat may be introduced into the mill through an external hot-oil jacket and/or a resistive heater.

In some examples, the method may also include crushing a raw feed of the alkaline earth metal carbonate to produce alkaline earth metal carbonate particles having a diameter of 0.25 inches or less (e.g., 0.20 inches or less, 0.15 inches or less, or 0.10 inches or less). In some examples, the method may also include introducing the alkaline earth metal carbonate particles into a mill to produce a coarse alkaline earth metal carbonate product having a particle size of 50 microns or less (e.g., 44 microns or less, 40 microns or less, 35 microns or less, 30 microns or less, or 25 microns or less).

In some examples, the method may also include introducing the coarse alkaline earth metal carbonate product into a secondary mill (e.g., an air classifier mill) to produce an alkaline earth metal carbonate product having a median particle size $d_{50}$ ranging from about 2 microns to about 25 microns (e.g., from about 2 microns to about 10 microns, from about 2 microns to about 15 microns, from about 2 microns to about 20 microns, from about 5 microns to about 7 microns, from about 5 microns to about 8 microns, from about 5 microns to about 10 microns, from about 5 microns to about 15 microns, from about 5 microns to about 20 microns, from about 5 microns to about 25 microns, from about 7 microns to about 10 microns, from about 7 microns to about 15 microns, from about 7 microns to about 20 microns, or from about 7 microns to about 25 microns). In some examples, the alkaline earth metal carbonate product having a median particle size $d_{50}$ ranging from about 2 microns to about 10 microns is introduced into the stirred media mill.

Some examples of the method may also include mixing the alkaline earth metal carbonate and the carboxylic acid and/or carboxylic acid salt prior to the dry grinding. For example, the mixing may include mixing via a conveying screw and/or a high shear mixer, such as a ribbon blender or continuous blending and mixing systems that may or may not be heated to promote early melting of the carboxylic acid and/or carboxylic acid salt surface-treating agent.

Some examples of the method, may also include air classifying the surface-treated alkaline earth metal carbonate particulate to obtain a coarse product of the surface-treated alkaline earth metal carbonate particulate having a median particle size $d_{50}$ ranging from, for example, about 1.0 microns to about 10 microns, and a fine product of the surface-treated alkaline earth metal carbonate particulate having a median particle size $d_{50}$ ranging from, for example, about 0.5 microns to about 7 microns. In some such examples, the method may also include reintroducing the coarse product into the stirred media mill for additional combined surface-treatment and grinding, the stirred media mill continuing to contain carboxylic acid and/or carboxylic acid salt surface-treating agent. In some such examples, the method may further include introducing the fine product into a classifier (e.g., an air classifier, a cyclone, or another type of classifier) to obtain a steepened fine product having a median particle size of, for example, about 9 microns or less and a steepness ranging from, for example, about 1 to about 5, and a steepened coarse product having a median particle size of, for example, about 1.5 microns or greater and a steepness ranging from, for example, about 1 to about 5.

This disclosure is also generally directed to a polymer composition that may include a surface-treated alkaline earth metal carbonate particulate obtained from any method described herein, and a polymer. In some examples, the polymer may include biopolymers and biodegradable polymers, such as, for example, polyhydroxyalkanoates (PHAs), pol-3-hydroxybutyrate (PHB), polyhydroxyvalerate (PHV), polyhydroxyhexanoate (PHH), polylactic acid (PLA), polybutylene succinate (PBS), polycaprolactone (PCL), polyglutamic acid (PGA), and polyvinyl alcohol (PVOH), which may be used, for example, in biodegradable packaging and disposable items, such as single-use cups and straws.

In some examples of the polymer composition, the polymer may include a polyolefin. In some such examples, the polymer composition may exhibit at least one of improved compound consistency, improved consistency in compound processing, reduced screen blinding during compounding, reduced polymer oxidation and degradation and reduced equipment wear during processing.

In some examples, the surface-treated alkaline earth metal may be used as an agonist in the film structure around which pores form in at least one of biaxially-oriented polypropylene, microporous polyethylene, or films including at least one of polyethylene or polypropylene. In some such examples, a product may include the polymer composition, and the product may be, for example, garbage bags, backing materials, masking films, labeling, plastic paper, house wrap, roofing membranes, grocery sacks, diapers, bandages, training pants, sanitary napkins, surgical drapes, and surgical gowns. Some such example products may exhibit at least one of improved film consistency, improved printability, reduced volatile organic compounds (VOC), reduced volatile liquids, improved opacity, or improved tensile strength.

In some examples, the polymer composition may include polyurethane. A product including such example polymer compositions may include at least one of an adhesive, a sealant, or a caulk. In some such product examples, the product may exhibit at least one of improved stability or controlled reaction time.

In some polymer compositions, the polymer composition may include polyvinyl chloride. A product including such polymer compositions may include at least one of rigid vinyl, rigid vinyl siding, rigid vinyl guttering, rigid vinyl decking, rigid vinyl fencing, or rigid vinyl window profiles. In some such product examples, the product may exhibit at least one of improved room temperature impact strength, low temperature impact strength, improved processability during extrusion, or reduced degradation during processing.

A product including some polymer compositions described herein may include a product produced by three-dimensional printing. In some such product examples, the product may exhibit at least one of improved dimensional stability, cooling rate, or resistance to slippage during printing.

The techniques and systems described herein may be implemented in a number of ways. Example implementations are provided below with reference to the figures.

Figure 1:
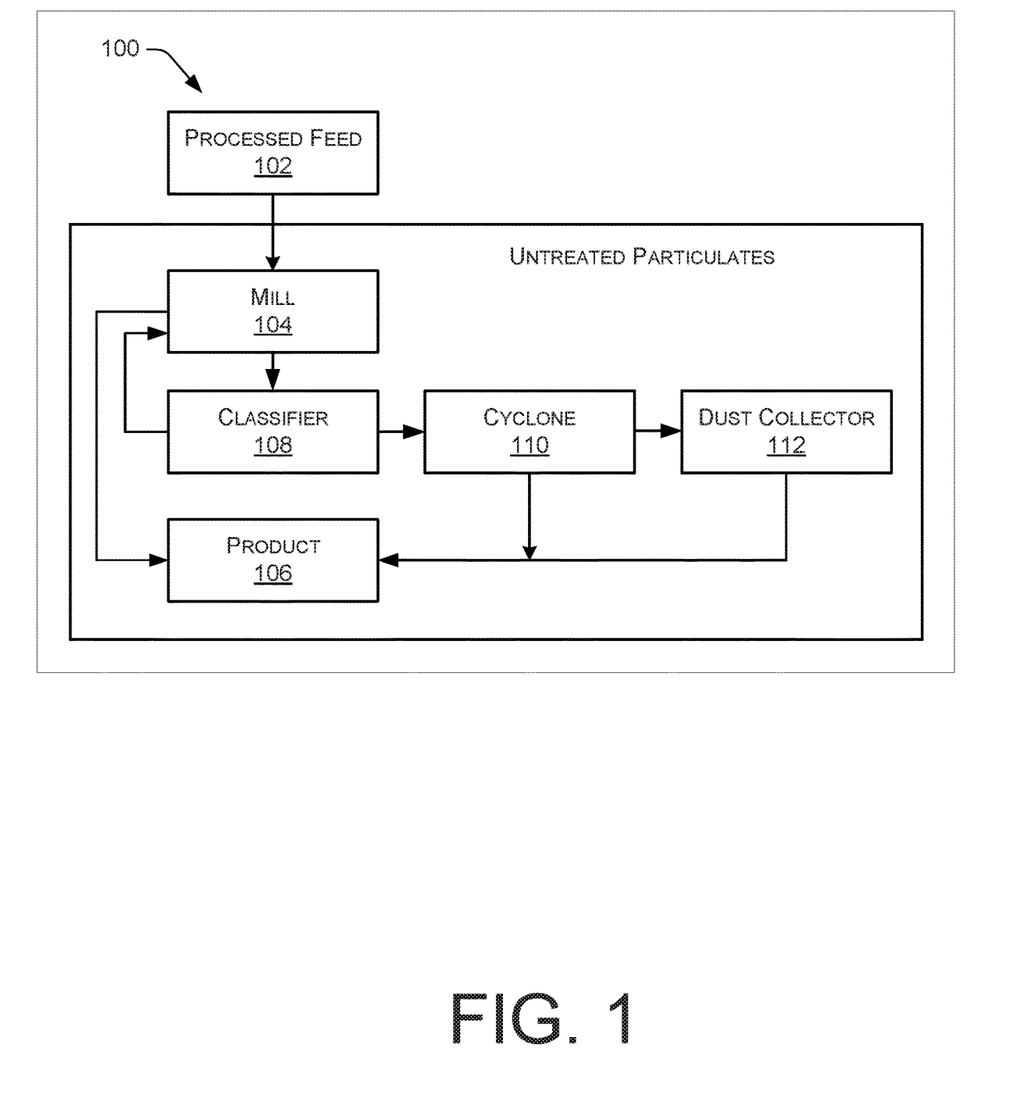
FIG. 1 is a block diagram of an example process for processing alkaline earth metal carbonates to obtain uncoated alkaline earth metal carbonate particulate products.

FIG. 1 is a block diagram of an example INCOA process 100 for processing alkaline earth metal carbonates to obtain an untreated particulate (e.g., an uncoated alkaline earth metal carbonate particulate). In the example process shown in FIG. 1, processed feed 102 of alkaline earth metal carbonate, for example, limestone ground to a median particle size $d_{50}$ ranging from about 2 microns to about 25 microns, is fed into a mill 104, for example, an air swept media mill or any other type of mill, excluding a centrifugal mill. This material may be processed to obtain the untreated particulate product. A portion of the coarse product, the processed feed 102, ranging from about 2 microns to about 25 microns may be separated as a product 106. Material that does not already have a desired median particle size may be transferred from the mill 104 to a classifier 108, for example, an air classifier or other type of classifier, and fine particles of a desired median particle size $d_{50}$ may be separated from the coarse product to enter the cyclone 110 to form the desired product 106, for example, particulates having a median particle size $d_{50}$ of about 9 microns or less. The fine material separated by the cyclone 110 may be collected in the dust collector 112, which may thereafter mix with the collected material into the product 106. The portion of the material not having the desired particle size and/or steepness may be transferred back from the classifier 108 to the mill 104 and ground to a finer median particle size. Once ground, the finer untreated particulates may be transferred back to the classifier 108 and a cyclone 110 as desired to obtain the untreated particulate product(s) 106 having the desired particle size and/or steepness. The fine material separated by the cyclone 110 may be collected in the dust collector 112, which may thereafter mix with the collected material into the product 106.

Figure 2:
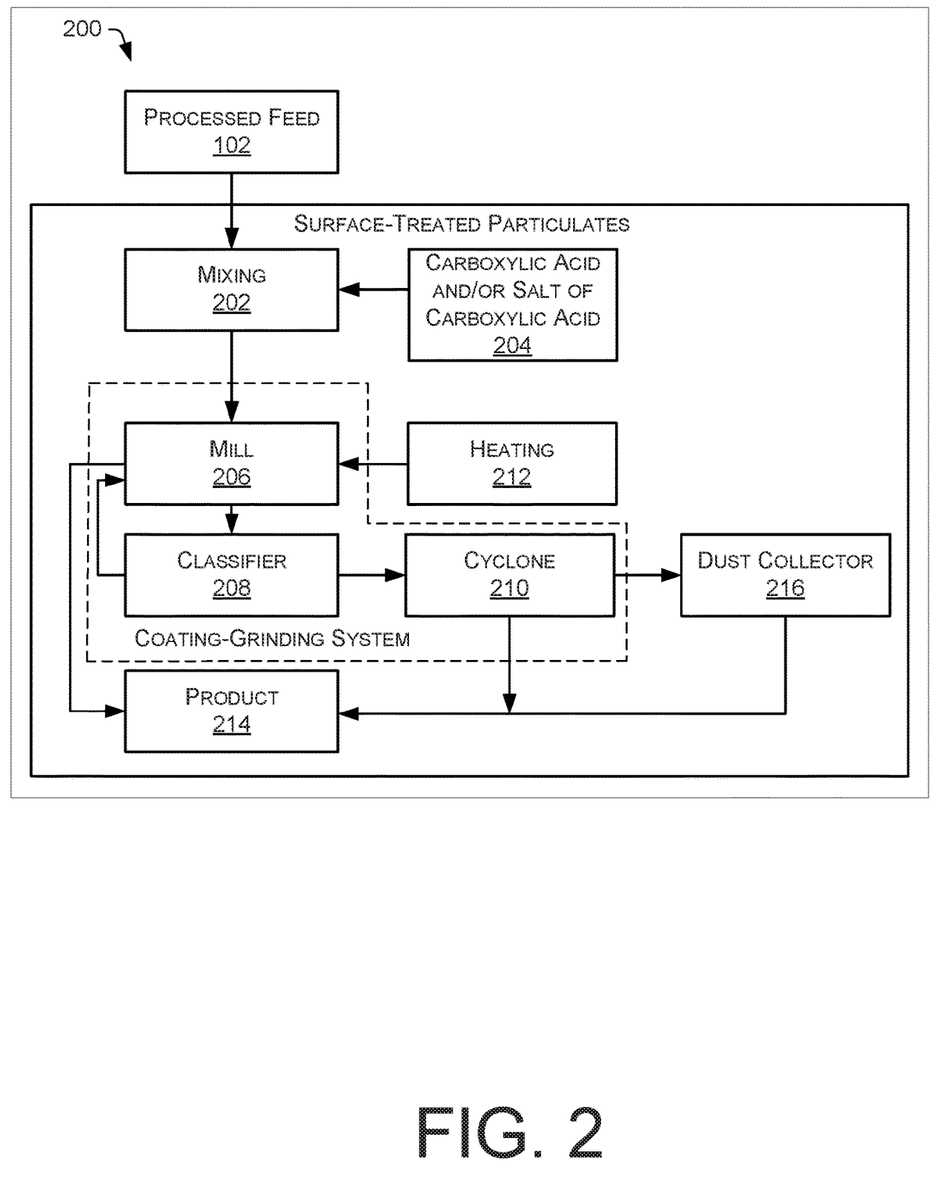
FIG. 2 is a block diagram of an example process for processing alkaline earth metal carbonates to obtain surface-treated alkaline earth metal carbonate particulates.

FIG. 2 is a block diagram of an example INCOA process 200 for processing alkaline earth metal carbonates to obtain surface-treated particulates, for example, coated alkaline earth metal carbonate particulates. In the example process 200 shown in FIG. 2, the coarse portion from a processed feed 102, for example, a processed feed 102 similar to the processed feed 102 in the process 100 shown in FIG. 1, having a median particle size $d_{50}$ ranging from about 2 microns to about 25 microns undergoes mixing 202 with, for example, carboxylic acid and/or carboxylic acid salt 204 (e.g., stearic acid). The mixing 202 may be performed by a conveying screw or through turbulent air stream mixing, although other types of mixers are contemplated (e.g., low- or high-shear mixers with or without heating). Following the mixing 202, the mixture of alkaline earth metal carbonate and carboxylic acid and/or a carboxylic acid salt is transferred to an integrated coating-grinding system that may include one or more of a mill 206 (e.g., an air-swept stirred media mill or any other type of mill, excluding a centrifugal mill), a classifier 208 (e.g., an air classifier or any other type of particulate classifier), and a cyclone 210. Heating 212 may be added to the process 200, for example, during the milling at the mill 206 to create a product 214 that has a temperature at the outlet of the mill 206, for example, ranging from about 180 degrees F. to about 600 degrees F. The heating 212 may be provided by use of an insulated hot-oil jacket. Other heating methods are contemplated.

While in the mill 206, the mixture of alkaline earth metal carbonate and carboxylic acid and/or carboxylic acid salt is both coated and ground as part of an integrated coating and grinding process to create the surface-treated particulates having a desired level of surface-treatment and desired particle size characteristics. In some examples of the process 200, the surface-treated particulate is transferred to the classifier 208 and a portion of the surface treated particulate is then transferred to a cyclone. The fine material separated by the cyclone 210 may be collected in the dust collector 216, which may thereafter mix with the collected material into the product 214. In such examples of the process 200, a portion of the surface-treated particulates not having the desired surface-treatment and size characteristics is transferred from the classifier 208 back to the mill 206, so that the combination surface-treatment and grinding process may be repeated in the mill 206 in the presence of the carboxylic acid and/or a carboxylic acid salt. This latter step in the process may be repeated until the surface-treated particulates have the desired level of surface treatment and a particle size within the desired range, at which point the surface-treated particulates are collected in the bin as product 214. In some examples, rather than passing from the mill 206 to the classifier 208, a portion of the surface-treated particulates having the desired level of surface-treatment and a particle size within the desired range may be transferred directly from the mill 206 to the bin of the collected products 214. As shown, and similar to the process 100 shown in FIG. 1, the fine material separated by the cyclone 210 may be collected in the dust collector 216, which may thereafter mix with the collected material into the product 214.

EXAMPLES

The following disclosure provides non-limiting example aspects of the methods, particulates, and/or products disclosed herein.

Example 1

Twenty samples of calcium carbonate materials having a median particle size $d_{50}$ ranging from about 5.96 microns to about 9.6 microns, with an average particle size of 7.63 microns, were used to manufacture twenty samples of final product through a stirred media mill coupled with an air classifier in a process consistent with the example process 100 shown in FIG. 1. The properties of the final products are shown in TABLE 1 below. The particle size distribution characteristics shown in TABLE 1 were measured by either (1) Malvern LLS measurement in alcohol on a treated product, or (2) Malvern LLS in dry air. The moisture was measured by a VaporPro at 225 degrees C.

TABLE 1

| | Analytical Data | | | | |
|---|---|---|---|---|---|
| | Median (microns) | Topcut (microns) | Span | % <0.5 microns (%) | Moisture (%) |
| Median | 3.0 | 11.2 | 1.7 | 3.6 | 0.15 |
| Average | 3.0 | 10.8 | 1.7 | 3.4 | 0.16 |
| StDev | 0.2 | 1.6 | 0.1 | 0.7 | 0.02 |
| n | 20 | 20 | 20 | 20 | 20 |

Example 2

Four samples were prepared in a manner consistent with the example process 200 described with respect to FIG. 2. The starting material calcium carbonate had a median particle size of about 7 microns. The properties of the final products are shown in TABLE 2 below. As with Example 1, the particle size distribution characteristics shown in TABLE 2 were measured by either (1) Malvern LLS measurement in alcohol on a treated product, or (2) Malvern LLS in dry air, and the moisture was measured by a VaporPro at 225 degrees C. The coating level was determined by the weight loss of a coated material when the organic coating is burned off in a muffle furnace at a temperature ranging from 600 degrees C. to 450 degrees C. for 30 minutes after correction for water by the simultaneous measurement of, by the same muffle furnace method, of the feed alkaline earth metal carbonate. In some such examples, the unreacted coating as measured by TGA/DSC is 0.2% of the applied coating.

TABLE 2

| | Median (microns) | Topcut (microns) | Span | % <0.5 microns | Coating Level (%) | Moisture (%) | #635 Residue (%) |
|---|---|---|---|---|---|---|---|
| | | | | Analytical Data | | | |
| Sample 1 | 3.2 | 14.8 | 1.69 | 0.05 | 0.96 | 0.08 | 0.14 |
| Sample 2 | 2.4 | 7.14 | 1.45 | 0.37 | 1.31 | 0.10 | 0.1 |
| Sample 3 | 2.2 | 6.36 | 1.34 | 0.44 | 1.15 | 0.09 | 0.1 |
| Sample 4 | 1.6 | 5.3 | 1.46 | 3.3 | 1.3 | 0.10 | 0.6 |

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples illustrated and described, and without departing from the spirit and scope of the present invention, which is set forth in the following claims.

EXAMPLE CLAUSES

A. An example method for processing alkaline earth metal carbonate, the method comprising:
   introducing alkaline earth metal carbonate into a stirred media mill; and
   dry grinding the alkaline earth metal carbonate in the stirred media mill to produce an alkaline earth metal carbonate particulate.

B. The method of example A, further comprising introducing carboxylic acid and/or carboxylic acid salt into the stirred media mill, wherein the dry grinding comprises dry grinding the alkaline earth metal carbonate and the carboxylic acid and/or carboxylic acid salt in an integrated dry grinding and surface-treating process in the stirred media mill to produce a surface-treated alkaline earth metal carbonate particulate.

C. The method of example A or example B, wherein the alkaline earth metal carbonate introduced into the stirred media mill has a level of sub 0.5 micron particles ranging from about 0% to about 4% of alkaline earth metal carbonate particles, wherein the level of sub 0.5 micron particles comprises particles having a particle size of 0.5 microns or less.

D. The method of any one of example A through example C, wherein the surface-treated alkaline earth metal carbonate has an agglomeration level of no more than about 2% by weight retained on a #635 screen.

E. The method of any one of example A through example D, wherein the surface-treated alkaline earth metal carbonate has a moisture content of 0.2% or less water as measured by the VaporPro at 225 degrees C.

F. The method of any one of example A through example E, wherein the surface-treated alkaline earth metal carbonate has a coating level ranging from about 0.5% to about 2.5% by weight.

G. The method of any one of example A through example F, wherein the surface-treated alkaline earth metal carbonate comprises unreacted stearic acid ranging from about 0% to about 0.5% by weight.

H. The method of any one of example A through example G, wherein the surface-treated alkaline earth metal carbonate particulate has a span ranging from about 1 to about 4.

I. The method of any one of example A through example H, wherein the surface-treated alkaline earth metal carbonate particulate has a median particle size $d_{50}$ of about 12 microns or less.

J. The method of any one of example A through example I, wherein the alkaline earth metal carbonate introduced into the stirred media mill has a median particle size $d_{50}$ ranging from about 2 microns to about 100 microns.

K. The method of any one of example A through example J, wherein the alkaline earth metal carbonate introduced into the stirred media mill has a purity ranging from about 98.5% to about 99.9%.

L. The method of any one of example A through example K, wherein the alkaline earth metal carbonate introduced into the stirred media mill has less than about 0.5% by weight quartz.

M. The method of any one of example A through example L, wherein the carboxylic acid and/or carboxylic acid salt comprises a carboxylic acid or carboxylic acid salt or mixture thereof having an average molecular weight between 100 and 500 g/mol.

N. The method of any one of example A through example M, wherein the carboxylic acid or salt or mixture thereof comprises a carboxylic acid or carboxylic acid salt having an average molecular weight between 225 g/mol and 300 g/mol.

O. The method of any one of example A through example N, wherein the alkaline metal earth carbonate comprises calcium carbonate.

P. The method of any one of example A through example O, wherein the surface-treated alkaline earth metal carbonate particulate has a median particle size $d_{50}$ ranging from about 1 micron to about 4 microns, from about 0.7 microns to about 4 microns, or from 0.5 microns to about 4 microns.

Q. The method of any one of example A through example P, wherein the stirred media mill comprises any grinding mill excluding a centrifugal mill.

R. The method of any one of example A through example Q, further comprising heating the alkaline earth metal carbonate and carboxylic acid during the dry grinding.

S. The method of any one of example A through example R, wherein the heating comprises heating the alkaline earth metal carbonate and carboxylic acid such that the surface-treated alkaline earth metal carbonate has a temperature ranging from about 180 degrees F. to about 600 degrees F.

T. The method of any one of example A through example S, wherein the heating comprises use of a hot-oil jacket.

U. The method of any one of example A through example T, further comprising mixing the alkaline earth metal carbonate and the carboxylic acid and/or carboxylic acid salt prior to the combination of dry grinding and surface-treating.

V. The method of any one of example A through example U, wherein mixing comprises mixing via one or more of a conveying screw, a turbulent air mixer, a high-shear blender, or a low-shear blender.

W. The method of any one of example A through example V, wherein following the combination of dry grinding and surface-treating the surface-treated alkaline earth metal carbonate particulate, the method further comprises:
  air classifying the surface treated alkaline earth metal carbonate particulate to obtain a coarse product of the surface treated alkaline earth metal carbonate particulate having a median particle $d_{50}$ ranging from about 1 micron to about 12 microns and a fine product of the surface treated alkaline earth metal carbonate particulate having a median particle size $d_{50}$ ranging from about 0.5 microns to about 9 microns; and
  reintroducing the coarse product into the stirred media mill for further drying grinding and surface-treating.

X. The method of any one of example A through example W, further comprising introducing the fine product into a cyclone to obtain a steepened fine product having a median particle size $d_{50}$ ranging from about 0.5 microns to about 5 microns and a span ranging from about 1 to about 2.5, and a steepened coarse product having a median particle size $d_{50}$ ranging from about 1.2 microns to about 7 microns and a span ranging from about 1 to about 3.0.

Y. An example polymer composition comprising:
  a surface-treated alkaline earth metal carbonate particulate obtained from the method of any one of example A through example X; and
  a polymer,
  wherein the polymer composition has at least one of the following characteristics:
    the polymer comprises a polyolefin;
    the polymer comprises a vinyl chloride polymer; or
    the polymer composition comprises between about 0.5% and 70% by mass of a particulate alkaline earth metal carbonate.

What is claimed is:

1. A method for processing alkaline earth metal carbonate, the method comprising:
  introducing alkaline earth metal carbonate into a stirred media mill;
  dry grinding the alkaline earth metal carbonate in the stirred media mill to produce an alkaline earth metal carbonate particulate;
  introducing one or more of carboxylic acid or carboxylic acid salt into the stirred media mill, the dry grinding comprising dry grinding the alkaline earth metal carbonate and the one or more of carboxylic acid or carboxylic acid salt in an integrated dry grinding and surface-treating process in the stirred media mill to produce a surface-treated alkaline earth metal carbonate particulate;
  air classifying, following the integrated dry grinding and surface-treating process, the surface-treated alkaline earth metal carbonate particulate to obtain a coarse product of the surface-treated alkaline earth metal carbonate particulate and a fine product of the surface-treated alkaline earth metal carbonate particulate; and
  introducing the fine product into a cyclone to obtain a steepened fine product having a median particle size $d_{50}$ ranging from about 0.5 microns to about 5 microns and a span ranging from about 1 to about 2.5, and a steepened coarse product having a median particle size $d_{50}$ ranging from about 1.2 microns to about 7 microns and a span ranging from about 1 to about 3.0.

2. The method of claim 1, wherein the alkaline earth metal carbonate introduced into the stirred media mill has a level of sub-0.5 micron particles ranging from about 0% to about 4% of alkaline earth metal carbonate particles, wherein the level of sub-0.5 micron particles comprises particles having a particle size of 0.5 microns or less.

3. The method of claim 1, wherein the surface-treated alkaline earth metal carbonate has an agglomeration level of no more than about 2% by weight retained on a #635 screen.

4. The method of claim 1, wherein the surface-treated alkaline earth metal carbonate has a moisture content of 0.2% or less water.

5. The method of claim 1, wherein the surface-treated alkaline earth metal carbonate has a coating level ranging from about 0.5% to about 2.5% by weight.

6. The method of claim 1, wherein the surface-treated alkaline earth metal carbonate comprises unreacted stearic acid ranging from about 0% to about 0.5% by weight.

7. The method of claim 1, wherein the surface-treated alkaline earth metal carbonate particulate has a span ranging from about 1 to about 4.

8. The method of claim 1, wherein the surface-treated alkaline earth metal carbonate particulate has a median particle size $d_{50}$ of about 12 microns or less.

9. The method of claim 1, wherein the alkaline earth metal carbonate introduced into the stirred media mill has a median particle size $d_{50}$ ranging from about 2 microns to about 100 microns.

10. The method of claim 1, wherein the alkaline earth metal carbonate introduced into the stirred media mill has a purity ranging from about 98.5% to about 99.9%.

11. The method of claim 1, wherein the alkaline earth metal carbonate introduced into the stirred media mill has less than about 0.5% by weight quartz.

12. The method of claim 1, wherein the one or more of carboxylic acid or carboxylic acid salt comprises a carboxylic acid or carboxylic acid salt or mixture thereof having an average molecular weight between 100 and 500 g/mol.

13. The method of claim 1, wherein the one or more of carboxylic acid or carboxylic acid salt comprises a carboxylic acid or carboxylic acid salt having an average molecular weight between 225 g/mol and 300 g/mol.

14. The method of claim 1, wherein the alkaline metal earth carbonate comprises calcium carbonate.

15. The method of claim 1, wherein the surface-treated alkaline earth metal carbonate particulate has a median particle size $d_{50}$ ranging from about 0.5 microns to about 4 microns.

16. The method of claim 1, wherein the stirred media mill comprises any grinding mill excluding a centrifugal mill.

17. The method of claim 1, further comprising heating the alkaline earth metal carbonate and the one or more of carboxylic acid or carboxylic acid salt during the dry grinding.

18. The method of claim 17, wherein the heating comprises heating the alkaline earth metal carbonate and the one or more of carboxylic acid or carboxylic acid salt such that the surface-treated alkaline earth metal carbonate has a temperature ranging from about 180 degrees F. to about 600 degrees F.

19. The method of claim 17, wherein the heating comprises use of a hot-oil jacket.

20. The method of claim 1, further comprising mixing the alkaline earth metal carbonate and the one or more of carboxylic acid or carboxylic acid salt prior to the integrated dry grinding and surface-treating process.

21. The method of claim 20, wherein mixing comprises mixing via one or more of a conveying screw, a turbulent air mixer, a high-shear blender, or a low-shear blender.

22. The method of claim 20, wherein:
the air classifying of the surface-treated alkaline earth metal carbonate particulate results in the coarse product having a median particle size $d_{50}$ ranging from about 1 micron to about 12 microns and the fine product having a median particle size $d_{50}$ ranging from about 0.5 microns to about 9 microns; and
the method further comprises reintroducing the coarse product into the stirred media mill for further drying grinding and surface-treating.

23. A polymer composition comprising:
a surface-treated alkaline earth metal carbonate particulate obtained from the method of claim 1; and
a polymer,
wherein the polymer composition has at least one of the following characteristics:
 the polymer comprises a polyolefin;
 the polymer comprises a vinyl chloride polymer; or
the polymer composition comprises between about 0.5% and 70% by mass of a particulate alkaline earth metal carbonate.

* * * * *